(12) United States Patent
Yamaguchi et al.

(10) Patent No.: US 6,961,316 B2
(45) Date of Patent: Nov. 1, 2005

(54) MOBILE COMMUNICATION SYSTEM HAVING ADAPTIVELY ASSIGNED PACKET RATE

(75) Inventors: Akira Yamaguchi, Tokyo (JP); Yoshio Takeuchi, Saitama (JP)

(73) Assignee: DDI Corporation, Tokyo (JP)

( * ) Notice: Subject to any disclaimer, the term of this patent is extended or adjusted under 35 U.S.C. 154(b) by 761 days.

(21) Appl. No.: 09/759,159

(22) Filed: Jan. 16, 2001

(65) Prior Publication Data

US 2001/0017851 A1 Aug. 30, 2001

(30) Foreign Application Priority Data

Jan. 24, 2000 (JP) ....................................... 2000-014600

(51) Int. Cl.⁷ .............................................. G01R 31/08
(52) U.S. Cl. ....................................... 370/252; 370/335
(58) Field of Search ................................ 370/336, 331, 370/335, 342, 328, 329, 446, 458, 337, 367, 252, 347, 468; 455/63.1, 63.2, 522, 507, 517, 426.1, 426.2

(56) References Cited

U.S. PATENT DOCUMENTS

| | | | | |
|---|---|---|---|---|
| 5,604,730 A | * | 2/1997 | Tiedemann, Jr. | ............. 370/252 |
| 5,615,210 A | * | 3/1997 | Kaiyama et al. | ............. 370/389 |
| 5,745,480 A | * | 4/1998 | Behtash et al. | ............. 370/252 |
| 6,240,288 B1 | * | 5/2001 | Wan et al. | ............... 455/426.1 |
| 6,259,685 B1 | * | 7/2001 | Rinne et al. | ................. 370/330 |
| 6,334,047 B1 | * | 12/2001 | Andersson et al. | ........... 455/69 |
| 6,381,233 B1 | * | 4/2002 | Sunaga | ........................ 370/335 |
| 6,473,624 B1 | * | 10/2002 | Corbett et al. | ............. 455/522 |
| 6,542,736 B1 | * | 4/2003 | Parkvall et al. | ............. 370/465 |
| 6,574,211 B2 | * | 6/2003 | Padovani et al. | ........... 370/347 |

OTHER PUBLICATIONS

PDT 6800 Series Portable Data terminal.*

* cited by examiner

*Primary Examiner*—Chau Nguyen
*Assistant Examiner*—Ricardo Pizarro
(74) *Attorney, Agent, or Firm*—Arent Fox PLLC

(57) ABSTRACT

In a mobile communication system having a plurality of radio packet channels of different transmission rate with each other between a base station and a mobile station, undesirable interference to adjacent cells of adjacent base stations is decreased. Signal quality of a receive signal at a mobile station is measured, and the better said signal quality is, the higher packet channel is assigned. Thus, although signal quality is poor because of long distance between a base station and a mobile station, no increase of transmission power of a base station is requested. Thus, interference to adjacent cells is decreased. When high rate packet channel is selected, short packet transmission time may be assigned so that amount of data transmission is kept uniform in spite of said signal quality.

7 Claims, 5 Drawing Sheets

MOBILE COMMUNICATION SYSTEM HAVING ADAPTIVELY ASSIGNED PACKET RATE

BACKGROUND OF THE INVENTION

The present invention relates to mobile communication system between a mobile station and a base station having a plurality of radio packet channels with different transmission rate with each other.

Conventionally, a mobile communication system for packet communication has a plurality of packet channels each having a single common transmission rate between a mobile station and a base station. In that system, when a free packet channel is selected, a duration for a packet transmission, or a number of frames for continuous transmission, is assigned.

On the other hand, in a future mobile communication system, such as IMT-2000 standard, packet channels having a plurality of transmission rates are possible. In that system, a packet channel having a desired transmission rate must be, first, selected, and then, a duration for a packet transmission can be assigned.

Figure 1:
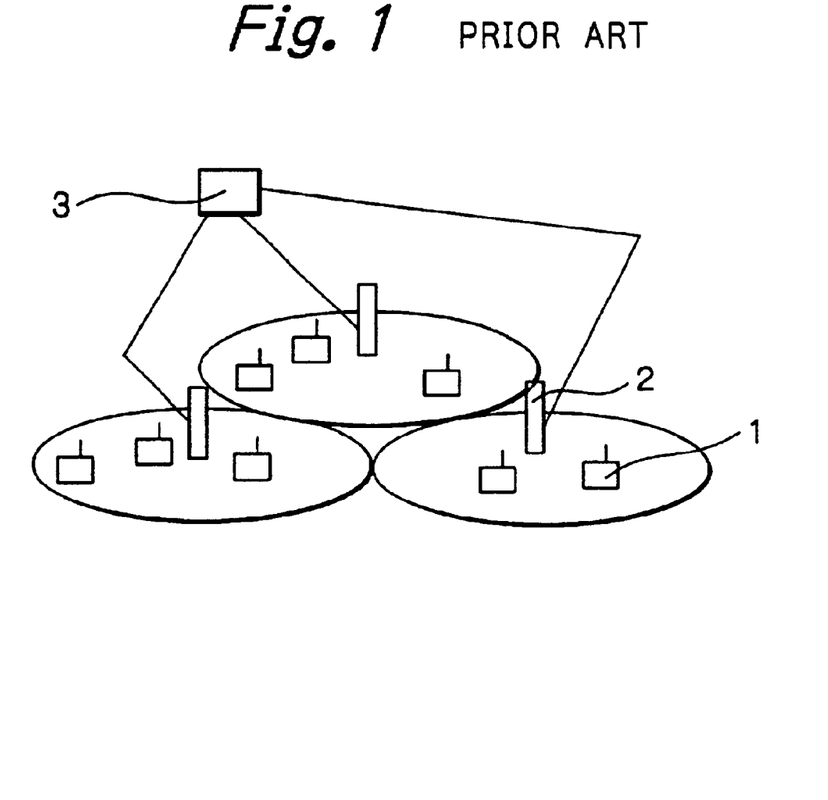
FIG. 1 shows a system configuration of a conventional mobile communication system.

FIG. 1 shows a configuration of a mobile communication system, in which there are a plurality of communication cells each located adjacently, and each cell comprises a base station 2 and a plurality of mobile stations 1. A base station 2 is controlled by a control station 3 which is installed for a plurality of base stations 2. An assignment of a packet is controlled either by a base station 2 or a control station 3.

In a mobile communication system, when distance between a base station and a mobile station is defined, the higher transmission power is requested for the higher transmission rate. On the other hand, when a transmission rate of a packet is defined, the higher transmission power is requested, the longer the distance between a base station and a mobile station is.

Therefore, when the distance between a base station and a mobile station is long, and a transmission rate of a packet is high, the highest transmission power is requested.

However, when the distance between a base station and a mobile station is long, in other words, the mobile station locates close to a border of the cell of the own mobile station and the adjacent cell, the radio wave to/from said mobile station would affect interference to communication of adjacent cells.

SUMMARY OF THE INVENTION

It is an object of the present invention to overcome the disadvantages and limitations of a prior packet assignment system by providing a new and improved packet assignment system in a mobile communication system.

It is also an object of the present invention to provide a packet assignment system in a mobile communication system, so that a radio packet is adaptively assigned so that no interference is affected to adjacent cells.

The above and other objects are attained by a mobile communication system having a plurality of radio packet channels having different transmission rate from each other between a base station and a mobile station; said mobile station comprising; means for measuring a signal quality of a receive signal from a base station, means for assigning packet rate relating to said signal quality thus measured, means for transmitting said packet rate to a base station, and data terminal for transmitting and receiving data to and from the base station with said packet rate.

Preferably, said signal quality is defined by propagation loss which is obtained by transmission power of a pilot signal at a base station and receive power of said pilot signal at a mobile station.

Preferably, said base station comprises; means for receiving packet rate from a mobile station, means for determining number of frames for continuous transmission for each packet rate, and means for transmitting said number of frames thus determined to a mobile station so that communication with said mobile station is carried out with the determined packet rate and the determined number of frames.

Still preferably, a short packet transmission time is assigned when a high transmission rate packet channel is selected, and a long packet transmission time is assigned when a low transmission rate packet channel is selected.

Still preferably, a small number of frames for continuous transmission and a large amount of data in each frame are assigned when a high transmission rate packet channel is selected, and a large number of frames for continuous transmission and a small amount of data in each frame are assigned when a low transmission rate packet channel is selected, so that data amount to be transmitted is uniform irrespective of selected transmission rate of a packet channel.

Preferably a packet channel is set a number of frames of continuous transmission for each transmission rate. Still preferably, said number of frames is adaptively adjusted.

Still preferably, when a high transmission rate packet channel is selected, a short packet transmission time is assigned, and when a low transmission rate packet channel is selected, a long packet transmission time is assigned, so that a mobile station takes a uniform amount of data to be transmitted or received, in spite of location relation of a base station and a mobile station. Preferable, when a high transmission rate packet channel is selected, a number of frames of continuous transmission is small and an amount of data for each frame is large, and when a low transmission packet channel is selected, a number of frames of continuous transmission is large and an amount of data for each frame is small.

Still preferably, a base station, upon finishing transmission or reception of a number of continuous frames to/from a mobile station, begins transmission or reception of a number of continuous frames to/from a next mobile station, so that a mobile station which communicates with a base station is switched recursively.

BRIEF DESCRIPTION OF THE DRAWINGS

The foregoing and other objects, features, and attendant advantages of the present invention will be appreciated as the same become better understood by means of the following description, wherein.

DESCRIPTION OF THE PREFERRED EMBODIMENTS

Figure 5:
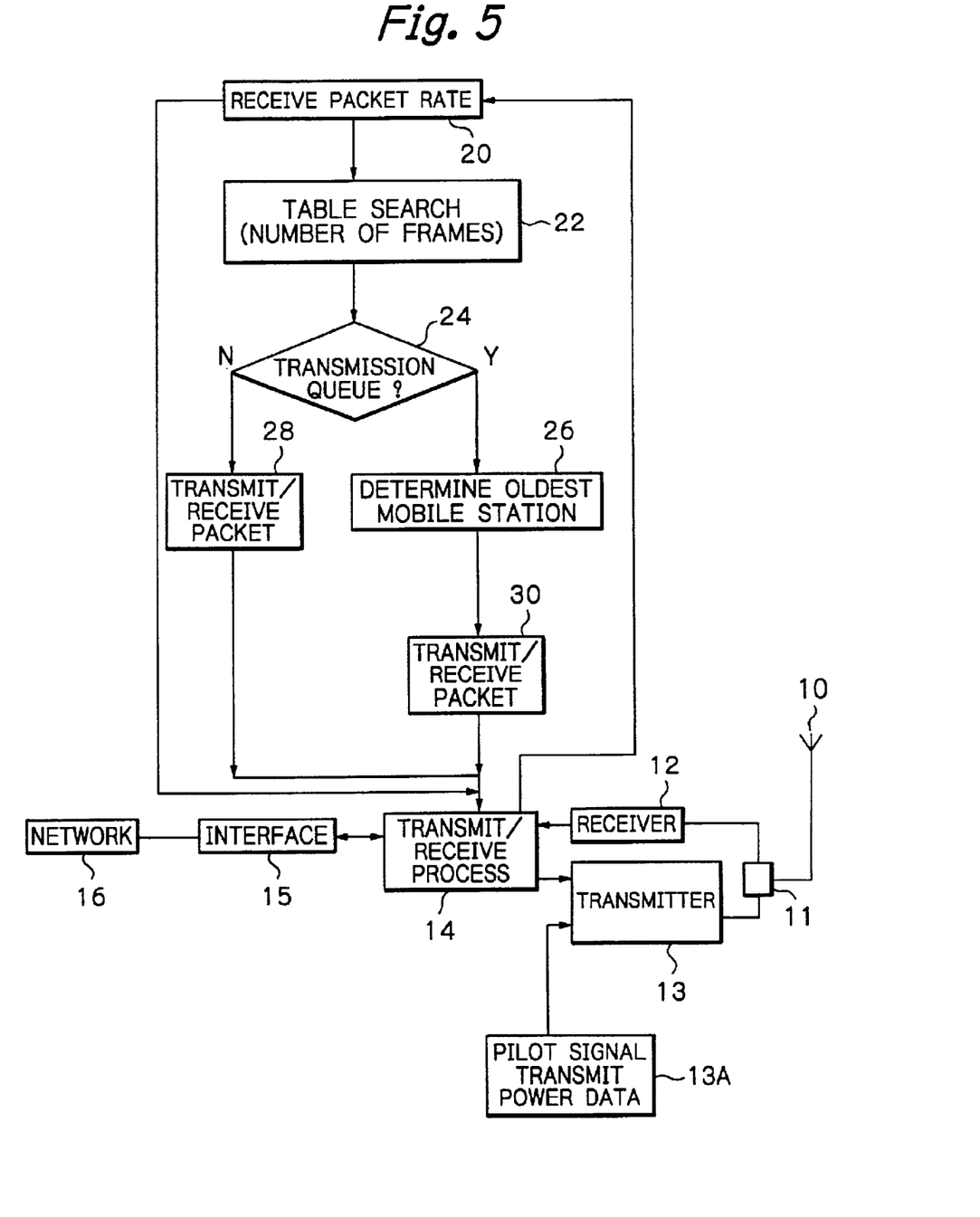
FIG. 5 shows a block diagram of a base station according to the present invention.
Figure 6:
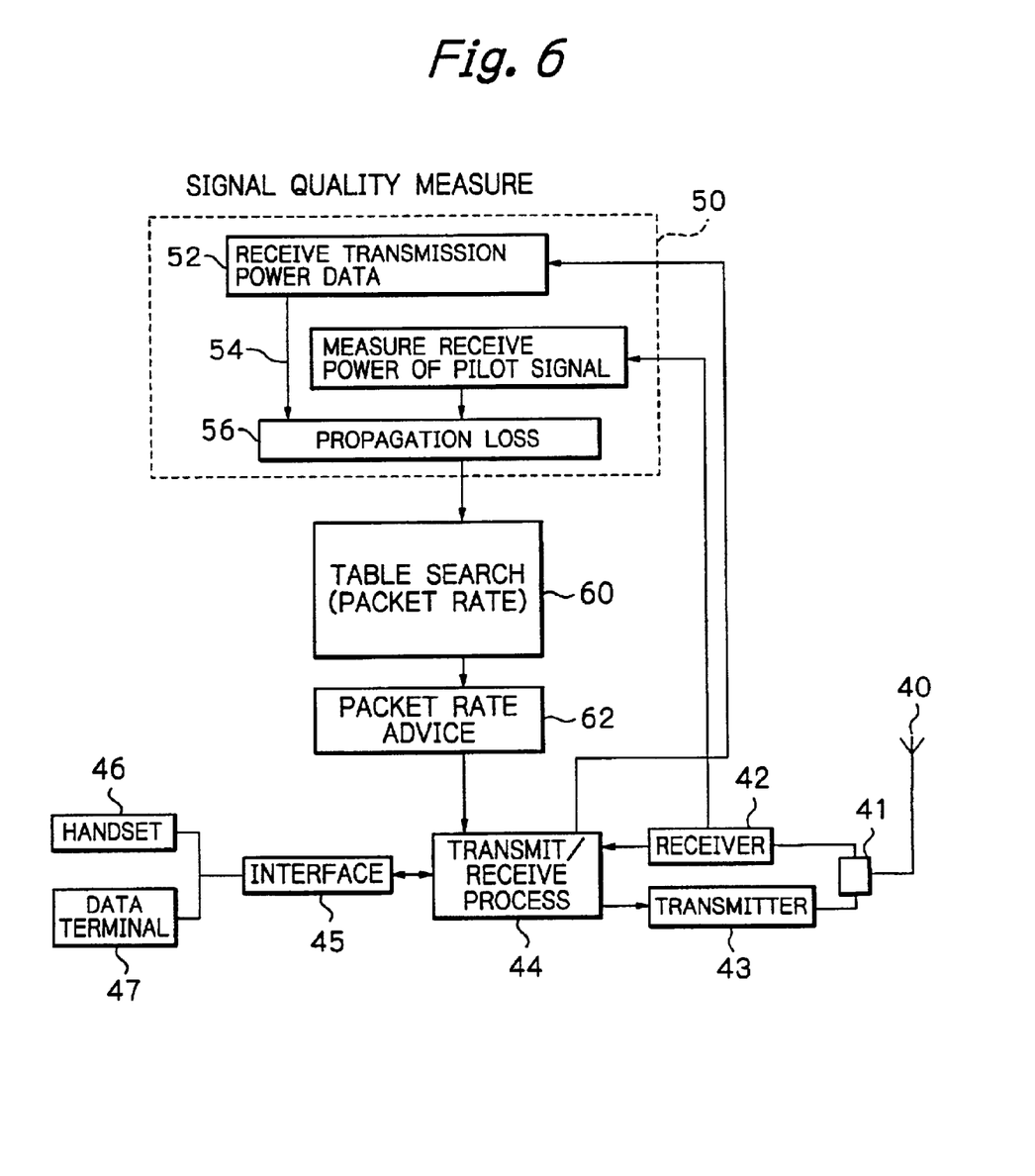
FIG. 6 is a block diagram of a mobile station according to the present invention.
Figure 7:
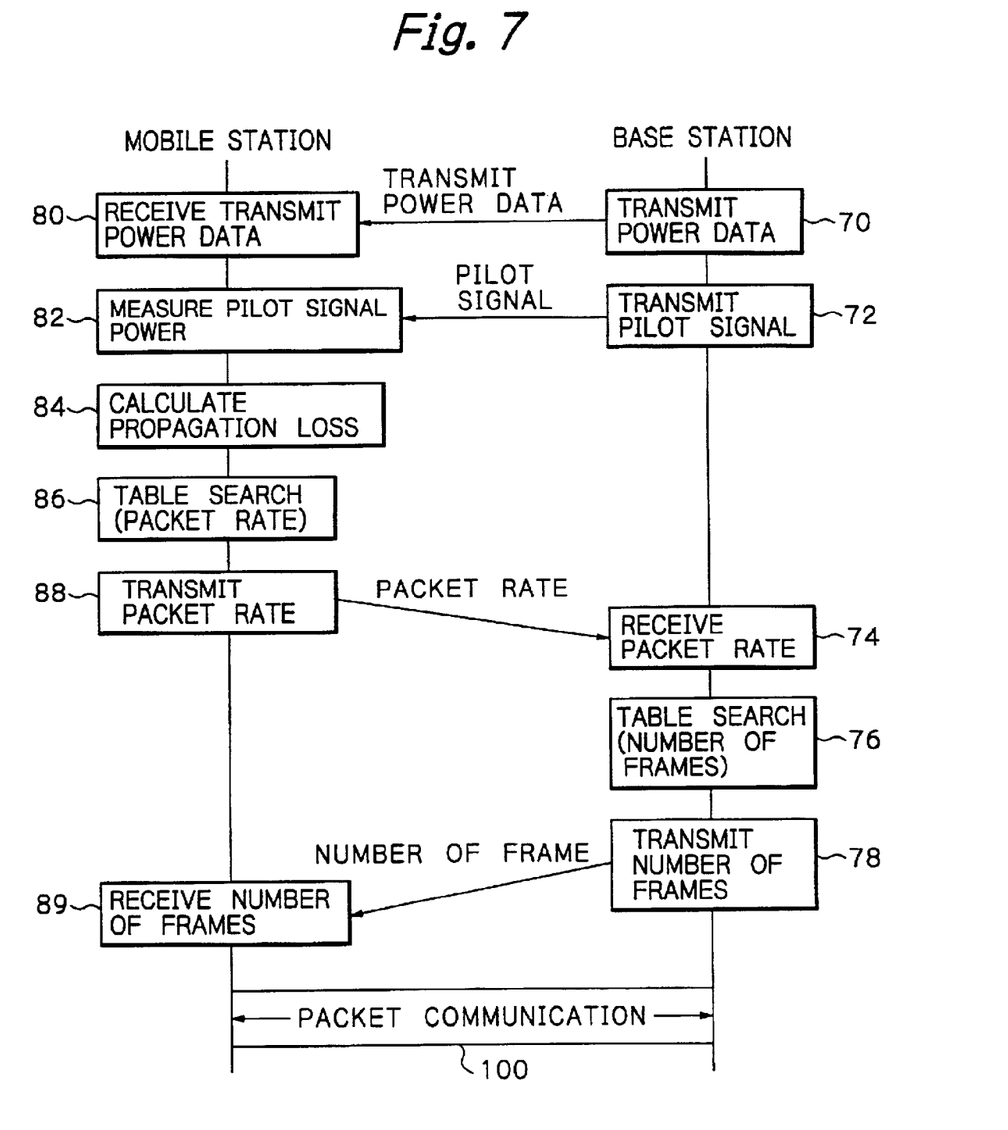
FIG. 7 shows signal sequence between a base station and a mobile station according to the present invention.

FIG. 5 is a block diagram of a base station according to the present invention, FIG. 6 is a block diagram of a mobile station according to the present invention, and FIG. 7 shows signal sequence between a base station and a mobile station.

It is assumed in the present invention that no transmission power control is carried out in a base station and/or a mobile station, in other words, a base station and/or a mobile station transmits with the maximum power which is allowed to the base station and/or the mobile station, irrespective of transmission rate.

In FIG. 5, a base station comprises an antenna 10, an antenna duplexer 11 for common use of a single antenna both for transmission and reception, a receiver 12 for receive process including frequency conversion from radio frequency to baseband frequency and demodulation, a transmitter 13 for transmit process including frequency conversion from baseband frequency to radio frequency and modulation. The numeral 13A is a means for transmitting a pilot signal and a transmission power of the own base station, and is coupled with the transmitter 13. The numeral 14 is a transmit/receive process for packeting/unpacketing, multiplexing/demultiplexing, and transmission of a number of continuous frames depending upon a determined communication ratio. The transmit process 14 is coupled with a network 16 through an interface 15.

The numeral 20 is a packet rate receiver, coupled with the transmit process 14, for receiving a packet rate which is transmitted by a mobile station. An output of the Packet rate receiver 20 is applied to a frame number decision process 22 which determines a number of frames transmitted continuously depending upon a packet rate. According to the present invention, when a packet rate is high, a number of frames transmitted continuously is small, and when a packet rate is low, said number is large, so that a number of frames in each transmission is almost uniform irrespective of a packet rate. The frame number decision process 22 has a table for determining a number of frames for continuous transmission for each packet rate received from a mobile station.

An output of the frame number decision process 22 is applied to a transmission queue 24 which shows whether there is a transmission queue of another mobile station in the base station or not. If the answer is yes, a mobile station which is waiting for transmission for the longest duration is determined (process 26), and a packet is transmitted or received to or from the determined mobile station (process 30). If the answer in the process 24 is no, a packet is transmitted or received to or from the mobile station which supplied a packet rate (process 28).

An output of the transmit/receive packet process 28 and an output of the transmit/receive packet process 30 are applied to the transmit/receive process 14, for transmission/reception of a packet through a transmitter 13 or a receiver 12 and an antenna 10.

A mobile station shown in FIG. 6 comprises an antenna 40, an antenna duplexer 41, a receiver 42 for receive process including frequency conversion and demodulation, a transmitter 43 for transmit process including frequency conversion and modulation, a transmit/receive process 44 for packeting/unpacketing, multiplexing/demultiplexing, and reception of a number of frames for continuous transmission.

The transmit/receive process 44 is coupled with a handset 46 for speech and a data terminal 47 through an interface 45. The data terminal 47 transmits/receives data.

The numeral 50 is a receive signal quality measure which measures a receive signal quality, which may be a propagation loss which is calculated by a receive level of a pilot signal and a transmission power of a base station. In the embodiment of FIG. 6, the process 52 receives the data of transmission power of a pilot signal by a base station, the process 54 measures receive power of a pilot signal at a mobile station, and the process 56 calculates the propagation loss which is the difference of the transmit power of a pilot signal at a base station and the receive power of a pilot signal at a mobile station.

The numeral 60 is a table search which determines a packet rate according to measured signal quality. When a signal quality is good, a packet rate is determined to be high, and when a signal quality is poor, a packet rate is determined to be low. A plurality packet rates are listed in a table corresponding to each signal quality, and one of the packet rate is selected according to the receive signal quality.

The determined packet rate is applied to a packet rate advice 62, and is transmitted to a base station.

FIG. 7 shows a signal sequence between a base station and a mobile station for determining a packet rate and a number of continuous frames.

In FIG. 7, upon establishing a circuit between a base station and a mobile station, a base station transmits a mobile station a transmit power data (process 70). Alternatively, said transmit power data may be broadcast by a base station. That transmit power data is received by the mobile station (process 80), then the mobile station measures receive power of a pilot signal (process 82). The propagation loss (process 84) is calculated as the difference between the transmit power of a pilot signal at a base station and the receive power of a pilot signal at a mobile station.

Then, the mobile station searches a table (process 86) to determine a packet rate according to a signal quality (propagation loss) thus measured. The mobile station transmits the determined packet rate to the base station (process 88).

The base station receives the packet rate (process 74), then, determines a number of continuous frames according to the packet rate through a table search (process 76). The number of continuous frames thus determined is transmitted to the mobile station (process 78).

The mobile station receives the number of continuous frames (process 89).

Then, the mobile station and the base station begin the packet communication based upon the determined packet rate and the determined number of continuous frames (process 100). Thus, a data terminal 47 (FIG. 6) begins the communication with another mobile station or a network through a base station with the determined packet rate.

Now, some modifications of the present invention will be described. The modifications concern how a signal quality is defined.

Figure 2:
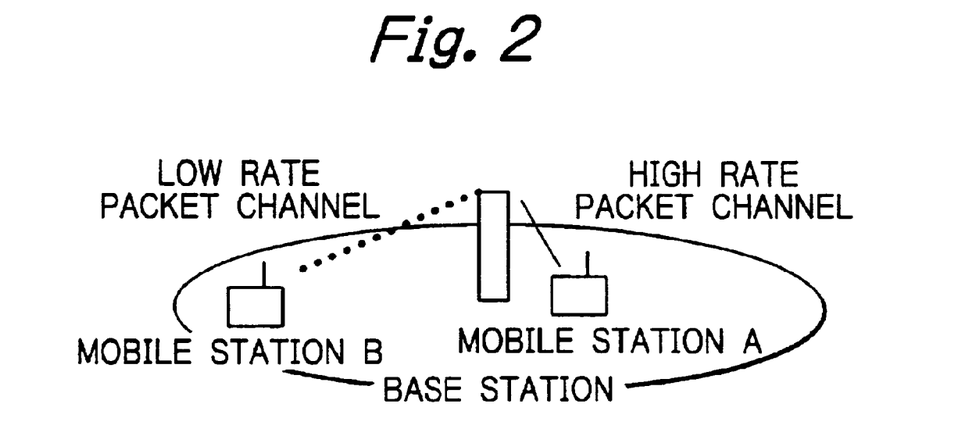
FIG. 2 is a system configuration of an embodiment of a mobile communication system according to the present invention.

FIG. 2 shows an explanatory figure of a channel assignment for a packet according to the present invention, in which a signal quality at a mobile station is defined by a distance between a mobile station and a base station. A distance between a mobile station and a base station is first measured. When the distance is short, a high rate packet channel is assigned, and when the distance is long, a low rate packet channel is assigned. As shown in FIG. 2, a mobile station A located close to a base station is assigned a high rate packet channel, and a mobile station B located far from a base station is assigned a low rate packet channel. Thus, no interference is affected to an adjacent base station, and further, receive level at a base station of a signal from a mobile station is essentially controlled to be almost uniform.

In another modification, instead of measuring a distance between a base station and a mobile station, a signal quality is defined by a receive level of a signal received by a mobile station. A high receive level implies that a distance between a base station and a mobile station is short, and a low receive level implies the distance is long. Therefore, a base station transmits a pilot signal, and a mobile station measures a receive level S of a pilot signal from the base station. When the receive level S is high, a high rate packet channel is assigned, and when the receive level S is low, a low rate packet channel is assigned, as shown in the table 1.

TABLE 1

| S | Packet channel | Comments |
| --- | --- | --- |
| Low | low rate packet channel | Mobile station B far from base station |
| High | high rate packet channel | Mobile station A near to base station |

Figure 3:
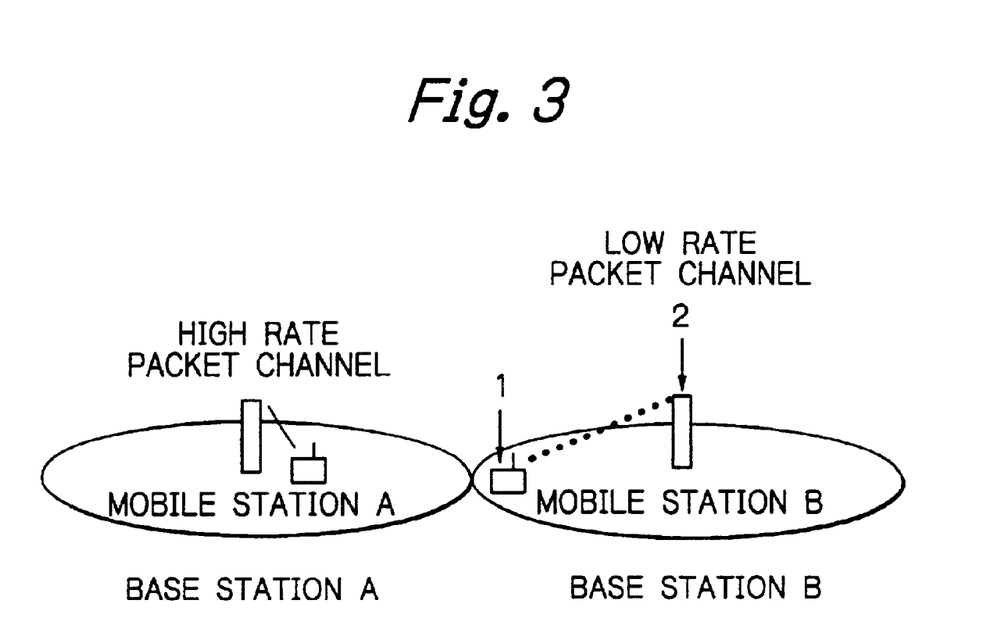
FIG. 3 is a system configuration of another embodiment of a mobile communication system according to the present invention.
Figure 4:
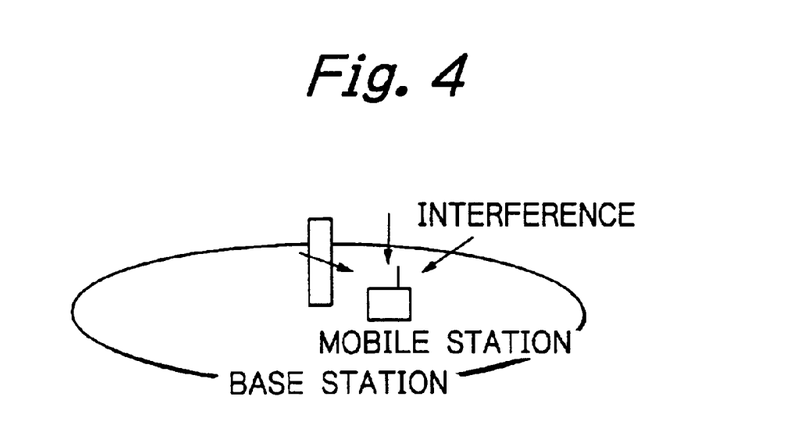
FIG. 4 is a system configuration of still another embodiment of a mobile communication system according to the present invention.

In still another modification, a signal quality at a mobile station is defined by a distance between a mobile station and a border of a cell which the mobile station belongs covers. When a distance between a mobile station and a border is long, it means that a distance between a mobile station and a base station is short, and when a distance between a mobile station and a border is short, it means that a distance between a mobile station and a base station is long. Therefore, as shown in FIG. 3, a mobile station A which locates far from a border is assigned a high rate packet channel, and a mobile station B which locates close to a border is assigned a low rate packet channel.

In still another modification, a signal quality at a mobile station is defined by a receive level of a signal from a base station which the mobile station belongs, and receive levels of signals from adjacent base stations. A first base station which a mobile station belongs, and other base stations adjacent to said first base station transmit a pilot signal. The mobile station measures a receive level $S_1$ of a pilot signal from the first base station which the mobile station belongs, and receive levels $S_2$–$S_n$ of pilot signals from other base stations located adjacent to said first base station. Then, the maximum receive level $S_{max}$ among receive levels $S_2$ through $S_n$ is selected, and the difference $\Delta S$ between the first receive level $S_1$, and said maximum receive level $S_{max}$ is calculated ($\Delta S = S_1 - S_{max}$). When $\Delta S$ is large, it implies that a distance between a mobile station and a border of a cell from the mobile station is long, and when $\Delta S$ is small, it implies that the distance is short. Therefore, when $\Delta S$ is large, a high rate packet channel is assigned, and when $\Delta S$ is small, a low rate packet channel is assigned, as shown in the table 2.

TABLE 2

| ΔS | Packet channel | Comments |
| --- | --- | --- |
| Small | low rate packet channel | mobile station B close to border |
| Large | high rate packet channel | mobile station A far from |

TABLE 2-continued

| ΔS | Packet channel | Comments |
| --- | --- | --- |
|  |  | border |

In still another modification, a receive signal quality at a mobile station is defined by an interference level I at a mobile station. When an interference level I is high, it means that there exist many other mobile stations near the own station. Therefore, it is essential to decrease transmission power so that interference affects less. On the other hand, when an interference level I is low, it is recognized that there exist less other mobile stations near the own station, and therefore, interference affects less even if transmission power is high.

Therefore, when an interference level I is low, high rate packet channel is assigned, and when interference level I is high, low rate packet channel is assigned. Table 3 shows the relations between an interference level I and packet channel to be assigned.

TABLE 3

| I | Packet channel | Comments |
| --- | --- | --- |
| Low | High rate packet channel | Less other mobile stations |
| High | Low rate packet channel | Many other mobile stations |

In still another modification, a receive signal quality at a mobile station is defined by receive SIR, or signal to interference ratio at a mobile station. When receive SIR is low, there exist many other mobile stations near own mobile station, and therefore, transmission power must be low so that interference affects less. On the other hand when receive SIR is high, there exist less mobile stations near own mobile station, and therefore, transmission power may be high.

Therefore, when receive SIR is low, low rate packet channel is assigned, and when receive SIR is high, high rate packet channel is assigned. Table 4 shows the relations between receive SIR and packet channel.

TABLE 4

| SIR | Packet channel | Comments |
| --- | --- | --- |
| High | High rate packet channel | Less mobile stations |
| Low | Low rate packet channel | Many mobile stations |

In still another modification, a receive signal quality at a mobile station is defined as follows. It is assumed the maximum transmission power $P_{max}$ assigned to a packet channel at a base station, transmission loss L measured between a base station and a mobile station, interference power I measured at a mobile station, desired SIR designated for each packet channel, process gain G designated for each packet channel, and compensation factor A for compensating characteristics of an antenna and equipment. Then, the highest rate packet channel is assigned on the condition that the following inequality Is satisfied.

$$P_{max} >= I - L + SIR - G + A$$

With the above scheme, the maximum rate packet channel available at the location of the mobile station is assigned. The closer to a base station the higher rate packet channel is assigned, and the farer from a base station, the lower rate packet channel is assigned.

As described above the present invention has the feature that a packet channel depends upon a receive signal quality at a mobile station or location relation of a mobile station and a base station. Therefore, rate of a packet channel to be assigned depends upon location where a mobile station locates.

Next, the present invention further provides a system which assures a predetermined uniform amount of data transmission to all the mobile stations, in spite of transmission rate of a packet channel.

In still another modification, a packet channel may be assigned a number of frames of continuous transmission for each transmission rate. Preferably, said number of frames of continuous transmission may be adaptively adjusted.

In still another modification, when high rate packet channel is assigned, short packet transmission time is assigned, and when low rate packet channel is assigned, long packet transmission time is assigned. Short packet transmission time means that the maximum number $N_{max}$ of frames to be transmitted continuously is small, and long packet transmission time means that the value $N_{max}$ is large.

In still another modification, when high rate packet channel is selected, a number of frames to be transmitted continuously is assigned small and amount of data for each frame is assigned large, and when low rate packet channel is selected, a number of frames to be transmitted continuously is assigned large and amount of data for each frame is assigned small. Amount of data for each frame is called as a frame payload, which is large for high rate packet channel. Table 5 shows an example. Thus, the same amount of data transmission is assured to all the mobile stations, in spite of rate of a packet channel.

TABLE 5

| Packet channel | Number of frames $N_{max}$ of continuous transmission | Frame Payload | Amount of data |
| --- | --- | --- | --- |
| High (1024 Mbps) | 1 | 128 kbytes (1024 kbits) | 1.024 Mbps |
| Low (16 kbps) | 64 | 2 kbytes (16 kbit) | 1.024 Mbps |

In still another modification, when the base station finishes transmission or reception of the maximum continuous number of frames with a certain mobile station, the base station starts transmission or reception of the maximum continuous number of frames with another mobile station, so that a mobile station communicating with the base station is switched recursively.

With the above scheme, amount of data transmission of each mobile station is kept uniform.

Two priority modes in operation of communication control of the whole system are possible as follows.

First priority mode; amount of data of each mobile station is kept constant.

Second priority mode; amount of data of a base station is kept constant.

In the above embodiments and modifications, it is assumed that the first priority mode is taken. As for the second priority mode, amount of data of a base station may be the maximum by assigning the value $N_{max}$ of high rate packet channel large and the value $N_{max}$ of low rate packet channel small. Thus, the flexible control of operation of a mobile communication system is possible merely by assigning a value of $N_{max}$.

As described above, according to the present invention which assigns a radio packet adaptively, a transmission rate and/or transmission time of a packet is assigned adaptively according to location relation of a base station and a mobile station. Therefore, communication between a base station and a mobile station interferes less with adjacent cells of adjacent base stations. Further, a predetermined uniform amount of data transmission is assigned to each mobile station, in spite of location relation of a base station and a mobile station. Further, flexible control is a mobile communication system is possible.

From the foregoing, it will now be apparent that a new and improved mobile communication system which assigns a radio packet channel adaptively has been found. It should be understood of course that the embodiments disclosed are merely illustrative and are not intended to limit the scope of the invention. Reference should be made to the appended claims, therefore, for indicating the scope of the invention.

What is claimed is:

1. A mobile communication system having a plurality of radio packet channels having different transmission rate from each other between each of a plurality of base stations and a mobile station, said mobile station comprising:

means for measuring a signal quality of a receive signal from each of the plurality of base stations;

means for assigning packet rate relating to said signal quality thus measured;

means for transmitting said packet rate to a respective base station of the plurality of base stations; and data terminal for transmitting and receiving data to and from the base station with said assigned packet rate, wherein said signal quality is defined by difference $\Delta S = S_1 - S_{max}$, where $S_1$ is level of pilot signal transmitted by the base station which the mobile station belongs received at said mobile station, $S_{max}$ is the highest level among $S_2$ through $S_n$ of the pilot signals from adjacent base stations received at said mobile station.

2. A mobile communication system having a plurality of radio packet channels having different transmission rate from each other between each of a plurality of base stations and a mobile station, said mobile station comprising:

means for measuring a signal quality of a receive signal from each of the plurality of base stations;

means for assigning packet rate relating to said signal quality thus measured;

means for transmitting said packet rate to a respective base station of the plurality of base stations; and data terminal for transmitting and receiving data to and from the base station with said assigned packet rate, wherein highest packet channel is assigned so that the following inequality is satisfied; $P_{max} >= I - L + SIR - G + A$; where $P_{max}$ is maximum transmit power of a packet channel, L is propagation loss measured at said mobile station, I is interference power measured at said mobile station, SIR is desired SIR for each packet channel, G is process gain for said each packet channel and A is compensation factor for compensating characteristics of antenna and equipment.

3. A mobile communication system having a plurality of radio packet channels having different transmission rate from each other between each of a plurality of base stations and a mobile station, said mobile station comprising:

means for measuring a signal quality of a receive signal from each of the plurality of base stations;

means for assigning packet rate relating to said signal quality thus measured;

means for transmitting said packet rate to a respective base station of the plurality of base stations; and data terminal for transmitting and receiving data to and from the base station with said assigned packet rate, wherein said base station comprises:
  means for receiving packet rate from said mobile station,
  means for determining number of frames for continuous transmission for said each packet rate,
  means for transmitting said number of frames thus determined to said mobile station so that communication with said mobile station is carried out with a determined packet rate and the determined number of frames.

4. A mobile communication system having a plurality of radio packet channels having different transmission rate from each other between each of a plurality of base stations and a mobile station, said mobile station comprising:
  means for measuring a signal quality of a receive signal from each of the plurality of base stations;
  means for assigning packet rate relating to said signal quality thus measured;
  means for transmitting said packet rate to a respective base station of the plurality of base stations; and
  data terminal for transmitting and receiving data to and from the base station with said assigned packet rate, wherein said base station comprises:
    means for receiving packet rate from said mobile station,
    means for determining number of frames for continuous transmission for said each packet rate,
    means for transmitting said number of frames thus determined to said mobile station so that communication with said mobile station Is carried out with a determined packet rate and the determined number of frames,
  wherein said number of frames to be transmitted continuously is adaptively controlled.

5. A mobile communication system having a plurality of radio packet channels having different transmission rate from each other between each of a plurality of base stations and a mobile station, said mobile station comprising:
  means for measuring a signal quality of a receive signal from each of the plurality of base stations;
  means for assigning packet rate relating to said signal quality thus measured;
  means for transmitting said packet rate to a respective base station of the plurality of base stations; and
  data terminal for transmitting and receiving data to and from the base station with said assigned packet rate, wherein said base station comprises:
    means for receiving packet rate from said mobile station,
    means for determining number of frames for continuous transmission for said each packet rate,
    means for transmitting said number of frames thus determined to said mobile station so that communication with said mobile station is carried out with a determined packet rate and the determined number of frames, and,
  wherein a short packet transmission time is assigned when a high transmission rate packet channel is selected, and a long packet transmission time is assigned when a low transmission rate packet channel is selected.

6. A mobile communication system having a plurality of radio packet channels having different transmission rate from each other between each of a plurality of base stations and a mobile station, said mobile station comprising:
  means for measuring a signal quality of a receive signal from each of the plurality of base stations;
  means for assigning packet rate relating to said signal quality thus measured;
  means for transmitting said packet rate to a respective base station of the plurality of base stations; and
  data terminal for transmitting and receiving data to and from the base station with said assigned packet rate, wherein said base station comprises:
    means for receiving packet rate from said mobile station,
    means for determining number of frames for continuous transmission for said each packet rate,
    means for transmitting said number of frames thus determined to said mobile station so that communication with said mobile station is carried out with a determined packet rate and the determined number of frames, and
  wherein a small number of frames for continuous transmission and a large amount of data in each frame are assigned when a high transmission rate packet channel is selected, and a large number of frames for continuous transmission and a small amount of data in each frame are assigned when a low transmission rate packet channel is selected, so that data amount to be transmitted is uniform irrespective of selected transmission rate of a packet channel.

7. A mobile communication system having a plurality of radio packet channels having different transmission rate from each other between each of a plurality of base stations and a mobile station, said mobile station comprising:
  means for measuring a signal quality of a receive signal from each of the plurality of base stations;
  means for assigning packet rate relating to said signal quality thus measured;
  means for transmitting said packet rate to a respective base station of the plurality of base stations; and
  data terminal for transmitting and receiving data to and from the base station with said assigned packet rate
  wherein said base station comprises:
    means for receiving packet rate from said mobile station,
    means for determining number of frames for continuous transmission for said each packet rate, and
    means for transmitting said number of frames thus determined to said mobile station so that communication with said mobile station is carried out with a determined packet rate and the determined number of frames,
  wherein a small number of frames for continuous transmission and a large amount of data in each frame are assigned when a high transmission rate packet channel is selected, and a large number of frames for continuous transmission and a small amount of data in each frame are assigned when a low transmission rate packet channel is selected, so that data amount to be transmitted is uniform irrespective of selected transmission rate of a packet channel, and,
  wherein said base station, upon finishing transmission/reception of a number of continuous frames to/from said mobile station, begins transmission/reception of said number of continuous frames to/from a next mobile station, so that said mobile station is switched recursively.

* * * * *